(12) United States Patent
Chae

(10) Patent No.: US 8,063,898 B2
(45) Date of Patent: Nov. 22, 2011

(54) CIRCUIT FOR DATA SYNCHRONIZATION OF I2C TIME CONTROLLER IN DISPLAY DEVICE AND METHOD THEREOF

(75) Inventor: Jong-Seok Chae, Gangnam-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 702 days.

(21) Appl. No.: 12/207,062

(22) Filed: Sep. 9, 2008

(65) Prior Publication Data
US 2009/0140781 A1  Jun. 4, 2009

(30) Foreign Application Priority Data
Dec. 3, 2007  (KR) .................. 10-2007-0124440

(51) Int. Cl.
*G06F 3/038* (2006.01)
*G09G 5/00* (2006.01)

(52) U.S. Cl. .................. 345/213; 345/534; 345/698

(58) Field of Classification Search .................. None
See application file for complete search history.

(56) References Cited

U.S. PATENT DOCUMENTS

| 5,692,166 | A | * | 11/1997 | Milhizer et al. | 713/400 |
|---|---|---|---|---|---|
| 6,037,925 | A | * | 3/2000 | Kim | 345/99 |
| 6,088,829 | A | * | 7/2000 | Umemura et al. | 714/798 |
| 6,175,361 | B1 | * | 1/2001 | Du et al. | 345/213 |
| 6,757,213 | B2 | * | 6/2004 | Kinoshita | 365/233.17 |
| 7,167,938 | B2 | * | 1/2007 | Noda | 710/110 |
| 2007/0186072 | A1 | * | 8/2007 | Woo | 711/167 |
| 2010/0223486 | A1 | * | 9/2010 | Deshpande | 713/400 |

FOREIGN PATENT DOCUMENTS

| KR | 10-0178588 | * | 5/1999 |
|---|---|---|---|
| KR | 10-0610702 | * | 8/2006 |

* cited by examiner

*Primary Examiner* — Richard Hjerpe
*Assistant Examiner* — Christopher Thompson
(74) *Attorney, Agent, or Firm* — Sherr & Vaughn, PLLC

(57) ABSTRACT

A method of controlling an interface between an I2C master in a time controller for a liquid crystal display and an external memory may include causing a pre-scaler to determine whether or not a first clock signal from the I2C master to the external memory is synchronized with a second clock signal from the external memory to the I2C master. If the first clock signal is not synchronized with the second clock signal, the pre-scaler stops transmission of a third clock signal for an I2C interface with the external memory to the I2C master.

20 Claims, 2 Drawing Sheets

_(1)_

CIRCUIT FOR DATA SYNCHRONIZATION OF I2C TIME CONTROLLER IN DISPLAY DEVICE AND METHOD THEREOF

The present application claims priority under 35 U.S.C. §119 to Korean Patent Application No. 10-2007-0124440 (filed on Dec. 3, 2007), which is hereby incorporated by reference in its entirety.

BACKGROUND

Generally, a liquid crystal display may include a display panel in which a screen is formed in pixel unit, a gate driver and a source drive for controlling the pixels of the display panel, and a control circuit for controlling the gate driver and the source driver. Each of the pixels of the display panel may include a MOS transistor and a capacitor. In the display panel, pixels, each having a capacitor and a transistor, are arranged in a lateral direction with respect to the lateral surface of the display panel by the number of source lines and are arranged in a vertical direction respect to the lateral surface of the display panel by the number of gate lines. An output terminal of the gate driver is connected to the gate of the MOS transistor as a switching transistor in the pixel and turns on/off the transistor. The source driver receives image data from a digital control circuit and converts the image data into an analog signal. Then, the source driver amplifies the analog signal in response to a clock signal from the control circuit and supplies the amplified signal to the capacitor of the pixel in which the transistor is turned on.

In order to control drive timing of the gate driver and the source driver, the control circuit is provided with a time controller (TCON) for time control. That is, the TCON generates a data control signal and a gate control signal by using horizontal/vertical synchronizing signals and transmits the generated signals to the source driver and the gate driver, respectively. Then, the source driver and the gate driver are driven in response to the control signals. The TCON supports an I2C protocol in order to perform an interface with an external memory, for example, an EEPROM.

Figure 1:
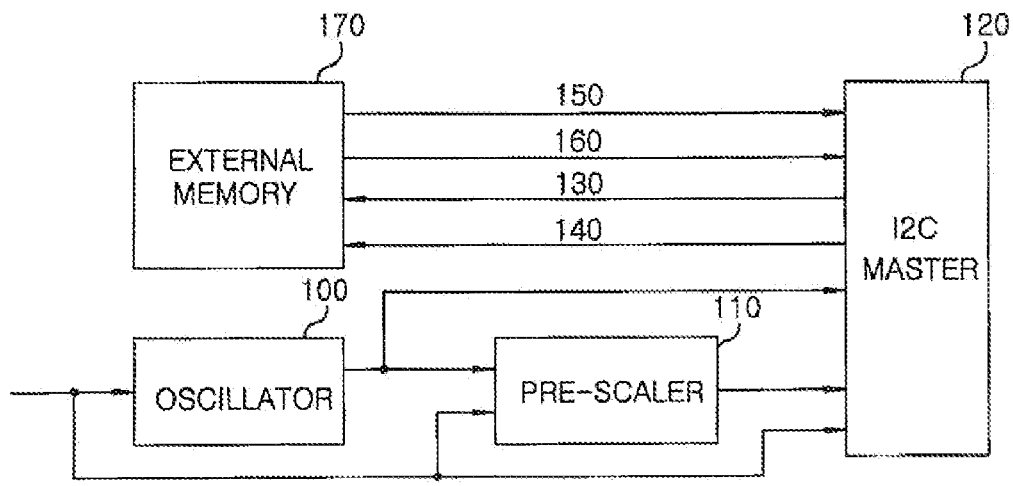

As illustrated in example FIG. 1, a TCON which supports an I2C protocol may include oscillator 100 that generates a clock signal, pre-scaler 110 that modulates the frequency of the clock signal and transmits the frequency-modulated clock signal to I2C master 120, and I2C master 120 which is interfaced with external memory 170 according to an I2C protocol. In such a TCON, since the operation of the external memory is simple, data synchronization between I2C master 120 and external memory 170 is not supported. For this reason, undesirable signal delay is generated when a data signal is transmitted between external memory 170 and the TCON, and accordingly, accurate data transmission may not be performed. For example, in I2C master 120, in which data synchronization is not supported, a predetermined command signal is generated and transmitted to the external memory in synchronization with the clock in order to read data in the external memory. This operation is illustrated in example FIG. 1. As illustrated in example FIG. 1, first clock signal 130 and first data transmission signal 140 are transmitted from I2C master 120 to external memory 170. Thereafter, when a determined time elapses, the data in external memory 170 is latched in synchronization with the clock signal. This operation is also illustrated in example FIG. 1. As further illustrated in example FIG. 1, second clock signal 150 and second data transmission signal 160 are transmitted from external memory 170 to I2C master 120. However, if external memory 170 is not ready to transmit data within a predetermined time, I2C master 120 latches erroneous data from external memory 170. Such a transmission error adversely affects the driving of the liquid crystal display.

SUMMARY

Embodiments relate to a method of controlling an interface between an I2C time controller (TCON) for a liquid crystal display and an external memory, and in particular, to a circuit and a method thereof for implementing a stable data latch in an asynchronous interface between the TCON and the external memory.

Embodiments relate to a TCON circuit and a method thereof for implementing a stable data latch in an asynchronous interface between an I2C master of the TCON and an external memory.

Embodiments relate to a method of controlling an interface between an I2C master in a TCON for a liquid crystal display and an external memory and may include at least one of the following steps: causing a pre-scaler to determine whether or not a first clock signal from the I2C master to the external memory is synchronized with a second clock signal from the external memory to the I2C master; and then when the first clock signal is not synchronized with the second clock signal, causing the pre-scaler to stop transmission of a third clock signal for an I2C interface with the external memory to the I2C master. In accordance with embodiments, the second clock signal from the external memory may be transmitted to the I2C master through a noise filter such that noise is removed therefrom. A tolerance of time delay for synchronization determination may be given between the first clock signal and the second clock signal, and the tolerance of time delay may be an integer multiple of an external clock for controlling the operation of the TCON.

Embodiments relate to a TCON for a liquid crystal display connected to an external memory, the TCON including at least one of the following: an I2C master that performs an I2C interface with the external memory; and a pre-scaler connected to a transmission path for a first clock signal from the I2C master to the external memory and a transmission path for a second clock signal from the external memory to the I2C master, and transmits a third clock signal for the I2C interface with the external memory to the I2C master. In accordance with embodiments, the external memory may include an EEPROM.

Embodiments relate to a method of controlling an interface between an I2C master in a TCON for a liquid crystal display and an external memory and may include at least one of the following steps: transmitting a first clock signal and a first data transmission signal from an I2C master to an external memory; transmitting a second clock signal and a second data transmission signal from the external memory to the I2C master, wherein noise is removed from a second clock signal and a second data transmission signal before the second clock signal is input to the I2C master; providing a pre-scaler between the external memory and the I2C master in a transmission path of the first clock signal and the second clock signal; comparing the first clock signal and the second clock signal; and then transmitting, after comparing the first clock signal and the second clock signal, a third clock signal to the I2C master using the pre-scaler to start an I2C interface between the I2C master and the external memory if the first signal is synchronized with the second clock signal.

In accordance with embodiments, in an asynchronous interface between an I2C master of a TCON and an external memory, an I2C interface is performed according to whether or not the external memory is ready to transmit data. Therefore, the I2C master can stably latch data, and thus an unstable operation of the TCON due to an error in the I2C interface can be suppressed. As a result, a reliable operation of a liquid crystal display can be achieved.

DRAWINGS

Example FIG. 1 illustrates a circuit diagram of a TCON including an I2C master and a pre-scaler.

Figure 2:
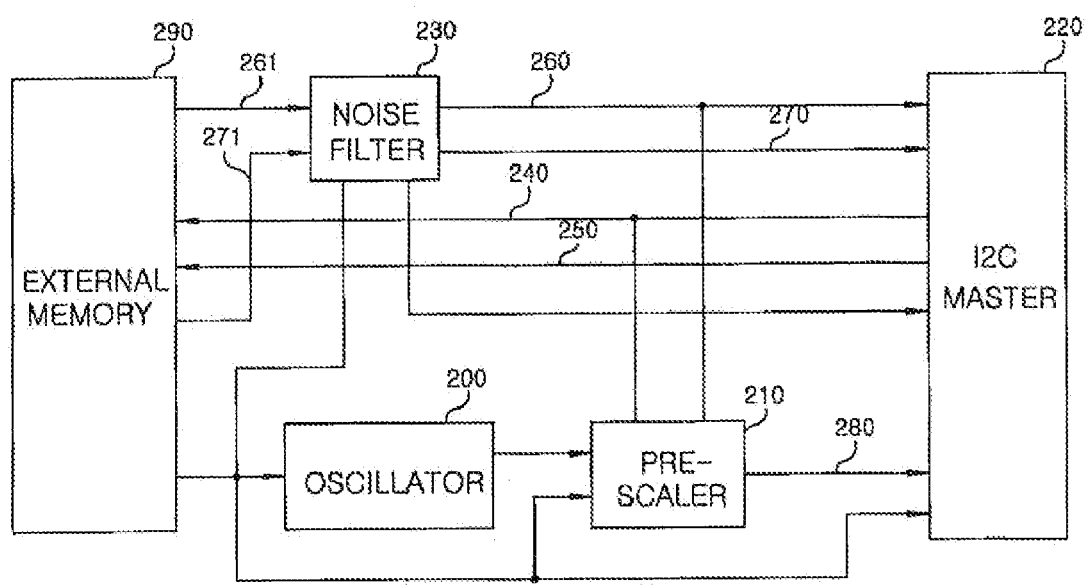

Example FIG. 2 illustrates a circuit diagram of a TCON in accordance with embodiments.

Figure 3:
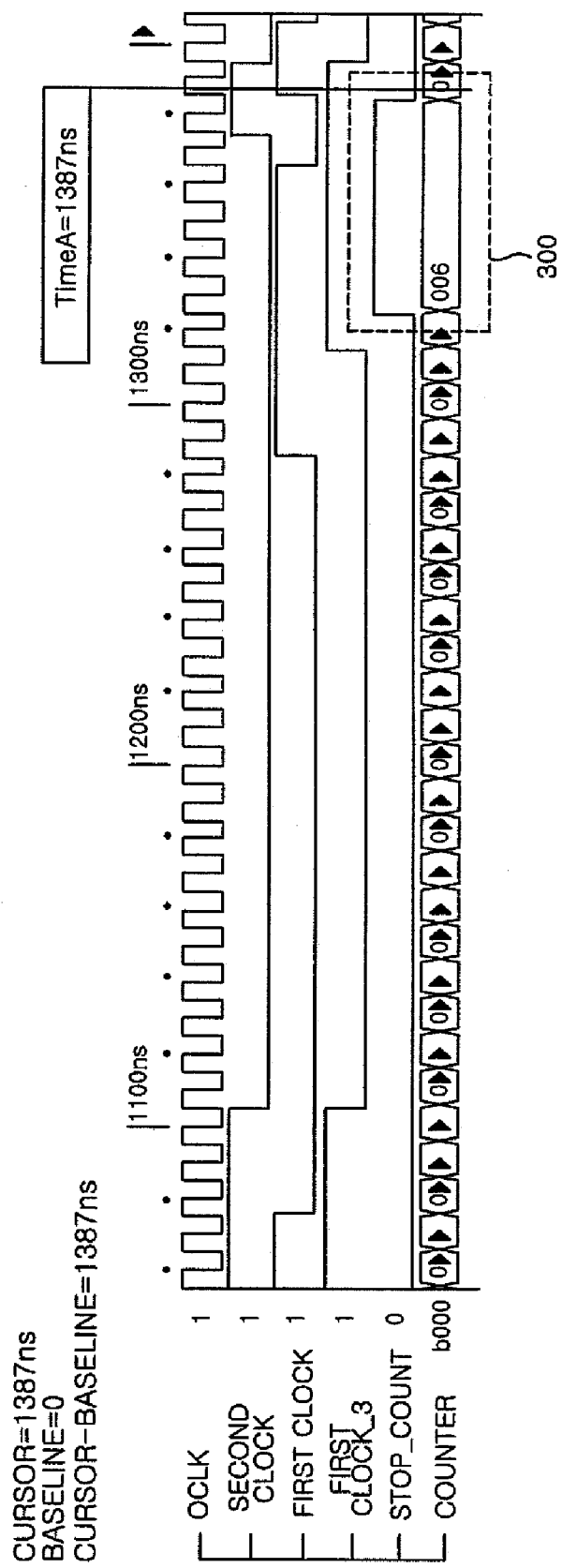

Example FIG. 3 illustrates a timing diagram of a TCON depending on a clock in accordance with embodiments.

DESCRIPTION

As illustrated in example FIG. 2, first clock signal 240 and first data transmission signal 250 are transmitted from I2C master 220 to external memory 290. Second clock signal 260 and second data transmission signal 270 are transmitted from external memory 290 to I2C master 220. Pre-scaler 210 is connected to a transmission path for first clock signal 240 and a transmission path for second clock signal 260, each transmission path existing between external memory 290 and I2C master 220. Second clock signal 260 and second data transmission signal 270 result from signals 261 and 271 transmitted from external memory 290 that pass through noise filer 230 which removes noise from signals 261 and 271. The noise-removed signals may then be input to I2C master 220.

Pre-scaler 210 modulates the frequency of the clock signal from oscillator 200 and also compares first clock signal 240 and second clock signal 260 and determines whether to enable I2C master 220 and external memory 290 to continuously operate or to stand by until external memory 290 is ready to transmit data. If pre-scaler 210 determines that external memory 290 is ready to transmit data and no problem occurs in the continuous operation, pre-scaler 210 transmits third clock signal 280 to I2C master 220 and starts the I2C interface between I2C master 220 and external memory 290. On the other hand, if pre-scaler 210 determines that external memory 290 is not ready to transmit data, pre-scaler 210 does not transmit third clock signal 280 and maintains a current state until external memory 290 is ready to transmit data.

Pre-scaler 210 compares first clock signal 240 from I2C master 220 to external memory 290 with second clock signal 260 the external memory 290 to I2C master 220 as follows. While operating according to an external clock, pre-scaler 210 determines whether or not first clock signal 240 is synchronized with second clock signal 260, i.e., whether or not they are both in a high state or a low state. When first clock signal 240 is synchronized with second clock signal 260, i.e., they are both in a high state or a low state, the I2C interface between external memory 290 and I2C master 220 can be normally performed. Therefore, pre-scaler 210 transmits third clock signal 280 for instructing the continuous operation to I2C master 220. On the other hand, when first clock signal 240 is not synchronized with second clock signal 260, i.e., one of them is in a high state and the other is in a low state (or vice-a-versa), data transmission/reception for the I2C interface between I2C master 220 and external memory 290 is not ready. Therefore, pre-scaler 210 does not transmit third clock signal 280 and stands by until synchronization is done.

A tolerance of time delay for synchronization determination may be given between the first clock signal and the second clock signal. As for the tolerance of time delay, even if a change in the second clock signal is not accurately temporally consistent with a change in the first clock signal, when both the clock signals are in the same state within a time range, it can be considered that synchronization is done. The tolerance of time delay may be an integer multiple of the external clock for controlling the operation of the TCON. Therefore, even if the initial first clock signal is not synchronized with the second clock signal when it is changed from the high state to the low state or from the low state to the high state, pre-scaler 210 changes the state of the next first clock signal after one cycle of the external clock and determines whether or not the first clock signal is synchronized with the second clock signal. While repeating this operation to an n-th (where n is an integer) cycle of the external clock, pre-scaler 210 determines whether or not the first clock signal is synchronized with the second clock signal. If synchronization is not done to a prescribed n-th power of one cycle of the external clock, pre-scaler 210 does not perform the operation any more and generates a stop counter signal at a cycle next to the n-th cycle of the external clock, that is, an (n+1)th cycle, and maintains the previous state.

As illustrated in example FIG. 3, pre-scaler 210 determines whether or not the first clock signal is synchronized with the second clock signal according to the external clock. In accordance with embodiments, the tolerance of time delay for synchronization determination between the first clock signal and the second clock signal is a third power of one cycle of the external clock. Therefore, as illustrated in example FIG. 3, when the initial first clock signal is changed from a high state to a low state, the second clock signal is in a high state, and thus, the initial first clock signal is not synchronized with the second clock signal. At this time, pre-scaler 210 does not generate the stop counter signal for stopping the operation and changes the first clock signal from the high state to the low state according to the external clock. As illustrated in example FIG. 3, it can be seen that when three cycles of the external clock elapse after the first clock signal is initially changed (i.e., first clock signal 3 is generated), the first clock signal is synchronized with the second clock signal. If the first clock signal is synchronized with the second clock signal within the tolerance of time delay, the I2C interface between I2C master 220 and the external memory 290 is preformed without interruption.

Similarly, when the first clock signal is changed from a low state to a high state and is not synchronized with the second clock signal, which is maintained in a low state, the stop counter signal is not immediately generated. That is, the first clock signal is changed from a low state to a high state within the tolerance of time delay, i.e., to the third power of one cycle of the external clock. However, if the first clock signal is not synchronized with the second clock signal, which is maintained in a low state, within the tolerance of time delay, pre-scaler 210 determines that external memory 290 is not ready for the I2C interface with I2C master 220. Then, pre-scaler 210 generates the stop counter signal at a rising edge of the fourth cycle after the third cycle of the external clock as the tolerance of time delay elapses. If the stop counter signal is generated, a counter stops a count operation. Therefore, until the first clock signal is synchronized with the second clock signal, pre-scaler 210 does not transmits the third clock signal to the I2C master 220 and maintains a standby state. This operation is indicated by reference numeral 300 in example FIG. 3.

Subsequently, if external memory 290 is ready to transmit data, the second clock signal is changed from a low state to a high state. While the second clock signal is maintained in a high state, if the first clock signal is changed from a low state to a high state, the first clock signal is synchronized with the second clock signal. This means that external memory 290 and I2C master 220 are ready to perform the I2C interface. Therefore, when the first clock signal is synchronized with the second clock signal, the counter restarts the count operation. Then, pre-scaler 210 transmits the third clock signal to I2C master 220, and thus, the I2C interface between the I2C master and the external memory is performed.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling an interface between an I2C master in a time controller for a liquid crystal display and an external memory, the method comprising:
   determining whether a first clock signal transmitted by the I2C master to the external memory is synchronized with a second clock signal transmitted by the external memory to the I2C master using a pre-scaler; and then
   preventing transmission of a third clock signal using the pre-scaler for an I2C interface with the external memory to the I2C master when the first clock signal is not synchronized with the second clock signal.

2. The method of claim 1, wherein the second clock signal is transmitted from the external memory to the I2C master through a noise filter such that noise is removed therefrom.

3. The method of claim 1, wherein a tolerance of time delay for synchronization determination is provided between the first clock signal and the second clock signal.

4. The method of claim 3, wherein the tolerance of time delay is an integer multiple of an external clock for controlling the operation of the time controller.

5. The method of claim 1, wherein determining whether the first clock signal is synchronized with the second clock signal comprises:
   determining whether the first clock signal and the second clock signal are in a high state or a low state.

6. The method of claim 1, wherein the external memory comprises an EEPROM.

7. A time controller for a liquid crystal display connected to an external memory, the time controller comprising:
   an I2C master that performs an I2C interface with the external memory; and
   a pre-scaler connected to a transmission path for a first clock signal from the I2C master to the external memory and a transmission path for a second clock signal from the external memory to the I2C master, the pre-scaler transmitting a third clock signal for the I2C interface with the external memory to the I2C master, wherein the pre-scaler determines whether the first clock signal is synchronized with the second clock signal.

8. The time controller of claim 7, further comprising:
   a noise filter provided between the external memory and the I2C master to remove noise from the second clock signal.

9. The time controller of claim 7, wherein the external memory comprises an EEPROM.

10. A method of controlling an interface between an I2C master in a time controller for a liquid crystal display and an external memory, the method comprising:
    transmitting a first clock signal and a first data transmission signal from an I2C master to an external memory;
    transmitting a second clock signal and a second data transmission signal from the external memory to the I2C master, wherein noise is removed from a second clock signal and a second data transmission signal before the second clock signal is input to the I2C master;
    providing a pre-scaler between the external memory and the I2C master in a transmission path of the first clock signal and the second clock signal;
    comparing the first clock signal and the second clock signal; and then
    establishing an I2C interface between the I2C master and the external memory if, after comparing the first clock signal and the second clock signal, the first clock signal is synchronized with the second clock signal.

11. The method of claim 10, wherein establishing an I2C interface between the I2C master and the external memory comprises:
    transmitting, after comparing the first clock signal and the second clock signal, a third clock signal to the I2C master using the pre-scaler if the first signal is synchronized with the second clock signal.

12. The method of claim 11, wherein comparing the first clock signal and the second clock signal is performed using the pre-scaler.

13. The method of claim 12, wherein determining whether the first clock signal is synchronized with the second clock signal comprises:
    determining whether the first clock signal and the second clock signal are in a high state or a low state.

14. The method of claim 10, wherein comparing the first clock signal and the second clock signal comprises:
    determining whether the first clock signal is synchronized with the second clock signal.

15. The method of claim 14, wherein determining whether the first clock signal is synchronized with the second clock signal comprises:
    determining whether the first clock signal and the second clock signal are in a high state or a low state.

16. The method of claim 10, wherein establishing an I2C interface between the I2C master and the external memory comprises:
    determining whether the first clock signal and the second clock signal are in a high state or a low state.

17. The method of claim 10, wherein the external memory comprises an EEPROM.

18. The method of claim 10, further comprising, after comparing the first clock signal and the second clock signal:
    preventing the establishment of an I2C interface between the I2C master and the external memory if the first clock signal is not synchronized with the second clock signal.

19. The method of claim 18, wherein preventing the establishment of an I2C interface between the I2C master and the external memory comprises:
    preventing transmission, after comparing the first clock signal and the second clock signal, of a third clock signal from the pre-scaler to the I2C master if the first signal is not synchronized with the second clock signal.

20. The method of claim 10, wherein a tolerance of time delay for determining whether the first clock signal is synchronized with the second clock signal is provided between the first clock signal and the second clock signal, the tolerance of time delay being an integer multiple of an external clock for controlling the operation of the time controller.

* * * * *